United States Patent [19]

Draxler

[11] 4,116,156

[45] Sep. 26, 1978

[54] MAINTENANCE ALARM ACTUATOR

[75] Inventor: Walter E. Draxler, Arlington Heights, Ill.

[73] Assignee: Arrow Pneumatic, Inc., Forest Park, Ill.

[21] Appl. No.: 800,252

[22] Filed: May 25, 1977

[51] Int. Cl.² ............................................. G01L 19/12
[52] U.S. Cl. ................................ 116/70; 116/114 PV; 210/90
[58] Field of Search .................. 116/70, 112, 114 AD, 116/114 PV, DIG. 7, DIG. 25, DIG. 42; 210/90

[56] References Cited

U.S. PATENT DOCUMENTS

| | | | |
|---|---|---|---|
| 2,678,134 | 5/1954 | Middleton | 116/114 PV X |
| 3,011,470 | 12/1961 | Stoermer | 116/114 PV X |
| 3,474,906 | 10/1969 | Tennis | 116/70 X |
| 3,495,566 | 2/1970 | Pall | 116/114 PV |

Primary Examiner—Richard C. Queisser
Assistant Examiner—John P. Beauchamp
Attorney, Agent, or Firm—Allegretti, Newitt, Witcoff & McAndrews

[57] ABSTRACT

A maintenance alarm actuator for a fluid filter actuates an alarm when contaminant has accumulated in the filter. The actuator is connected to fluid lines upstream and downstream of the filter. Included in the actuator are a valve and a biasing mechanism which biases the valve. The valve responds to the difference in the line pressures, and the actuator is initially triggered when the pressure of the upstream line exceeds that of the downstream line by an amount sufficient to overcome the force of the biasing mechanism. When initially triggered, the actuator vents the downstream line to the alarm, thereby increasing the difference in line pressure and causing itself to trigger completely.

3 Claims, 3 Drawing Figures

U.S. Patent  Sept. 26, 1978  4,116,156
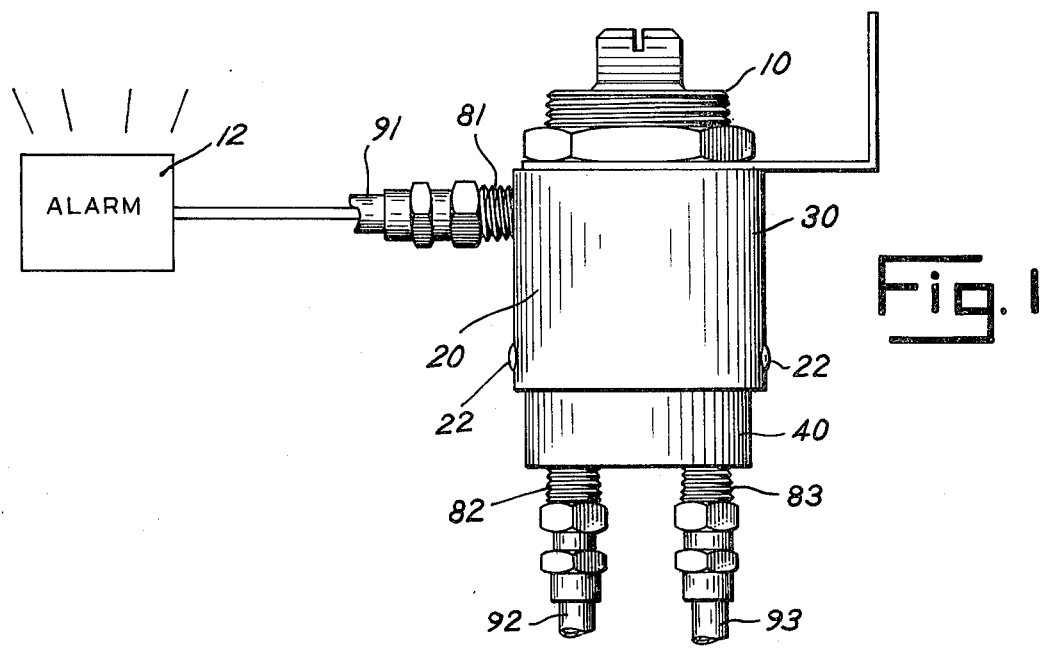
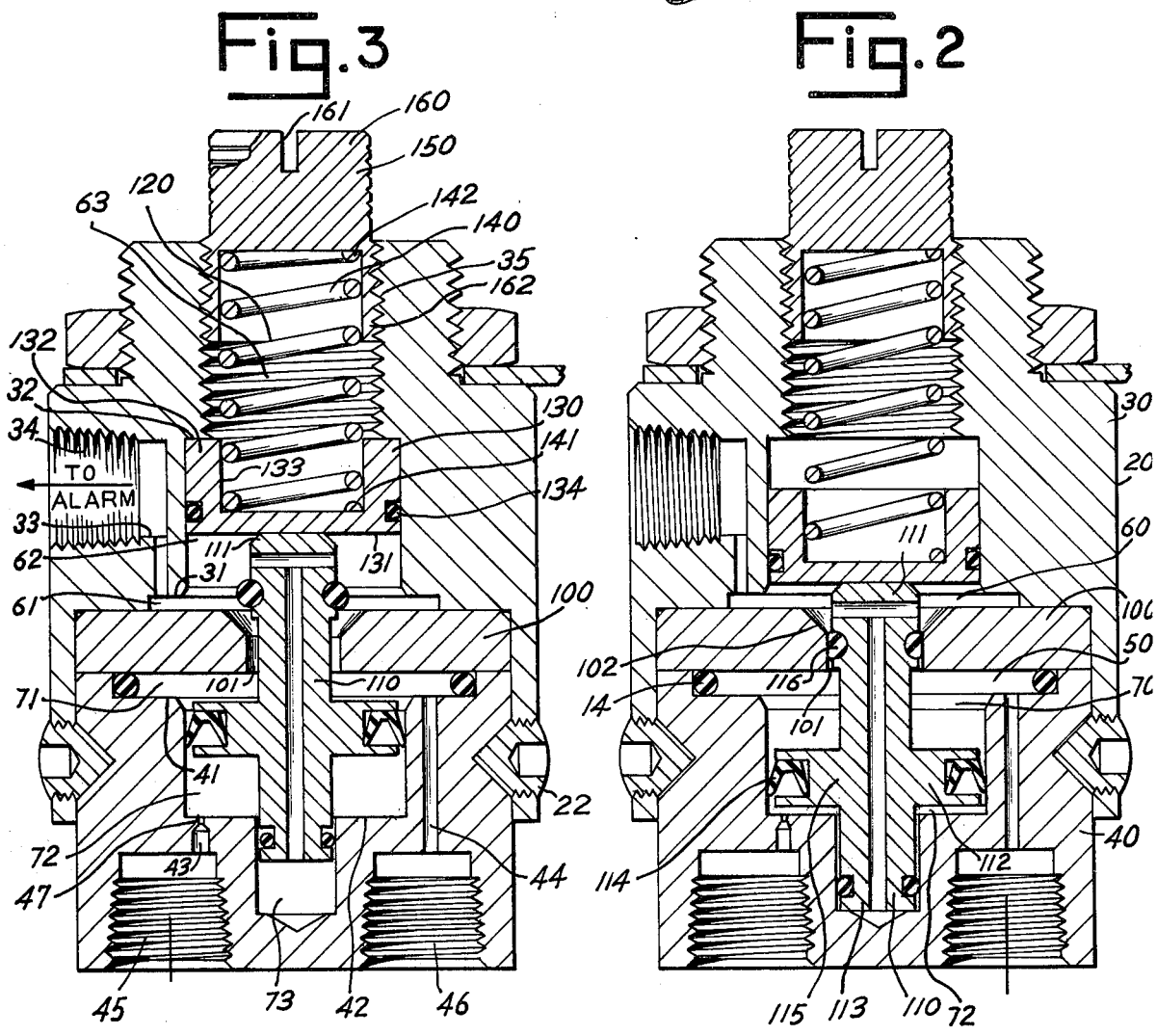

MAINTENANCE ALARM ACTUATOR

BACKGROUND OF THE INVENTION

This invention relates to an alarm and more particularly, to a maintenance alarm actuator for signalling the need for cleaning a fluid filter.

In the use of an air compressor or similar compressed air equipment, an air filter may be used to trap contaminant contained in the air lines. In a hydraulic system, a similar filter may be used. Since trapped contaminant blocks fluid flow and causes a drop in line pressure downstream from the filter, periodic cleaning of the filter is necessary for proper operation of the equipment. However, such cleaning is often overlooked or neglected because of a lack of outward indication that a filter should be cleaned.

In the past, a variety of devices have been developed for signalling that a fluid filter needs cleaning. Among such devices are those disclosed in U.S. Pat. Nos. 3,250,242 entitled: "Clogged Filter Indicator Device"; 3,279,418 entitled: "Device for Signalling Need for Cleaning or Replacing Suction Cleaner Dust Bag"; 3,325,010 entitled: "Filter Clogging Indicator"; 3,411,477 entitled: "Pressure Differential Indicator"; and No. Re. 28,268 entitled: "Device for Signalling Need for Cleaning or Replacing Suction Cleaner Dust Bag." Each of the devices disclosed in these patents is a useful device. However, there has remained a need for a device which actuates rapidly and creates a signal which is at full strength immediately, which is balanced for actuation by the same pressure difference regardless of line pressure, which can be reset for later acutation without shutting off the fluid line with which it is connected and which is itself free from clogging by contaminant trapped in the filter.

SUMMARY OF THE INVENTION

In a principal aspect, the present invention is a device for actuating an alarm to show that a fluid filter needs cleaning. The device is connected by fluid or pressure lines to the upstream and downstream sides of the fluid filter with which it is to be used, and responds to the difference in pressure between the upstream and downstream lines by venting the downstream line to the alarm. When initially triggered by a pre-selected pressure difference, the device vents the downstream line, thus increasing the pressure difference to which it responds and causing itself to trigger with a snap action.

The device includes a casing having a cavity with first and second fluid chambers, a balanced valve slidably mounted in the cavity, and a biasing mechanism for biasing the valve. The casing has an outlet to the alarm from the first chamber of the cavity, and upstream and downstream inlets into the second chamber. The upstream inlet opens into a portion of the second chamber away from the first chamber and the downstream inlet opens into a portion of the second chamber adjacent the first chamber. The valve separates the upstream and downstream inlets at all times, and is biased to a first operating position in which the first chamber and the outlet are sealed from the second chamber and the downstream inlet. When the pre-selected pressure difference is reached, the valve moves against the force of the biasing mechanism to a second operating position. In this second operating position the downstream inlet is vented through the first chamber and the outlet to the alarm.

In modified forms, the upstream inlet has a restriction for preventing triggering when fluid is first introduced into the filter, and an adjustment mechanism is included for adjusting the actuator to trigger at a plurality of pre-selected pressure differences.

It is thus a principal object of the present invention to provide a maintenance alarm actuator for a fluid filter which is triggered by a pressure difference built up across the filter when the filter has become contaminated.

Another object of the present invention is to provide a maintenance alarm actuator which will actuate rapidly with an initially strong signal rather than gradually with an initially weak signal.

A further object of the present invention is to provide a maintenance alarm actuator which has a balanced valve and thus can be used for a variety of line pressures.

A still further object is to provide a maintenance alarm actuator which can be reset to trigger at a higher pressure difference without shutting off the fluid line with which it is connected.

A still further object is to provide a maintenance alarm actuator which can be used to actuate a whistle, an electrical transducer or the like, at a considerable distance from the filter.

Further objects include providing a maintenance alarm actuator which is itself easily maintained, and providing an actuator which can be built into the filter or constructed as a separate unit.

These and other objects and advantages will become apparent from the description of the preferred embodiment which follows.

BRIEF DESCRIPTION OF THE DRAWING

A description of the preferred embodiment of the present invention follows, described in connection with the accompanying drawing, wherein:

FIG. 1 is an elevational view of a preferred embodiment of the present invention;

FIG. 2 is a vertical section view of the preferred embodiment illustrating the relative positions that parts of the preferred embodiment assume when a first operating position prevails; and FIG. 3 is a sectional view similar to that of FIG. 2, illustrating the relative positions that parts assume when a second operating position prevails.

DESCRIPTION OF THE PREFERRED EMBODIMENT

Referring generally to the drawing, the preferred embodiment of the present invention is shown and generally designated as a device 10, having a casing 20, as referred to in FIG. 1, a valve seat 100, valve member 110, as referred to in FIG. 2, a biasing mechanism 120 and an adjustment mechanism 150, as referred to in FIG. 3. Also shown in FIG. 1 is a fluid-pressure activated alarm 12, such as a whistle. It should be understood that alarm actuator 10 is connected to fluid lines upstream and downstream of a fluid filter (not shown), as will be more fully described below.

Referring now to FIG. 1, casing 20 is generally cylindrical, and is divided along a plane transverse to its longitudinal axis into a bonnet 30 and a body 40, bonnet 30 being secured atop body 40 by set screws 22. As shown in FIG. 2, casing 20 has a central, generally cylindrical cavity 50 formed therein, the longitudinal axis of cavity 50 being aligned with that of casing 20.

Cavity 50 is divided into two chambers. A first or upper chamber 60 is defined by bonnet 30, and a second or lower chamber 70 is defined by body 40. First chamber 60 is separated from second chamber 70 by valve seat 100, which lies in a plane transverse to the longitudinal axes of casing 20 and cavity 50, and is secured within cavity 50 between body 40 and bonnet 30. Seal 14 between the lower side of valve seat 100 and body 40 aids in sealing cavity 50 from the exterior. Valve seat 100 is generally annular, defining a passageway 101 between first chamber 60 and second chamber 70.

Also shown within a cavity 50 in FIG. 2 is valve member 110, which has a generally rod-like shape, with its longitudinal axis aligned with that of casing 20. Valve member 110 extends through passageway 101 of valve seat 100, and has an end portion 111 in first chamber 60, and a central portion 112 and other end portion 113 in second chamber 70.

Adjacent and above end 111 of valve member 110 in first chamber 60 is biasing mechanism 120, referred to in FIG. 3, which urges valve member 110 downward to the operating state of FIG. 2. Biasing mechanism 120 includes a piston 130 having a piston face 131 in contact with end 111 of valve 110, and a helical compression spring 140 with a lower end 141 contacting piston 130 within recess 133 on side 132 thereof, which is opposite piston face 131.

Also shown in FIG. 3 is adjustment mechanism 150, included for easy adjustment of the compression of spring 140. Adjustment mechanism 150 includes adjustment cap 160, which contacts spring 140 at its upper end 142. Adjustment cap 160 has a slot 161 at its top for easy adjustment using a screwdriver.

Referring again to casing 20, bonnet 30 has a first shoulder 31 and a second shoulder 32 formed therein, shoulders 31 and 32 thus dividing first chamber 60 longitudinally into three portions. These three portions are portion 61 below shoulder 31, portion 62 between shoulder 31 and shoulder 32, and portion 63 above shoulder 32. Portion 61 thus has a certain diameter, portion 62 having a smaller diameter and portion 63 having the smallest diameter of the three.

Each of the portions of first chamber 60 has a function. Portion 61 acts as an outlet portion, bonnet 30 defining an outlet channel 33, as referred to in FIG. 2, which lies along it length parallel to cavity 50 and opens into portion 61 through shoulder 31. Bonnet 30 also has defined therein a receptacle 34, aligned transverse to cavity 50, from the side of which channel 33 begins. Portion 62 of first chamber 60 serves as a guide for piston 130, which slides along portion 62 toward and away from second chamber 70. Piston 130 has an O-ring 134 or the like about its periphery, portion 61 thus being sealed from portion 63. Bonnet 30 has threads 35 defined along portion 63 of first chamber 60, portion 63 thus receiving adjustment cap 160, which has external threads 162 for engaging threads 35 of bonnet 30. The compression of spring 140 thus can be increased or decreased by screwing cap 160 in or out, thereby increasing or decreasing the force needed to trigger device 10.

Body 40, like bonnet 30, has two shoulders in cavity 12. A first shoulder 41 and a second shoulder 42 divide second chamber 70 longitudinally into three portions. Portion 71 is above first shoulder 41, portion 72 is between first shoulder 41 and second shoulder 42, and portion 73 is below shoulder 42. Portions 71, 72 and 73 have step-wise diameters, the diameter of portion 71 being the greatest and that of portion 73 the smallest.

Portion 72 acts as a first inlet portion, body 40 having a first inlet channel 43 defined therein, which parallels along its length the longitudinal axis of cavity 50 and opens into portion 72 through shoulder 42. Portion 71 also acts as an inlet portion, body 40 having a second inlet channel 44 defined therein which parallels the longitudinal axis of cavity 50 and opens into portion 71 through shoulder 41. Body 40 has two receptacles 45 and 46 defined at its bottom, inlet channels 43 and 44 beginning at the top ends of receptacles 45 and 46, respectively. Portions 72 and 73 also serve as guides for valve member 110, end 113 of valve member 110 slidably engaging body 40 along portion 73, central portion 112 of valve member 110 having a ring 115 formed therein, on the periphery of which a lip seal 114 is mounted for engaging body 40 along portion 72. The part of portion 72 below ring 115 is thus sealed from portion 71 when device 10 is in the first operating position shown in FIG. 2, and in the second operating position shown in FIG. 3, and in all states therebetween.

Valve member 110 also has at end 111 an O-ring 116, which is engagable against valve seat 100 along passageway 101, as shown in FIG. 2. A chambered surface 102 is provided in valve seat 100 to cause O-ring 116 to readily engage and disengage valve seat 100.

As noted briefly above, bonnet 30 defines a receptacle 34 and body 40 defines two receptacles 45 and 46. Each of these receptacles is internally threaded to receive an externally threaded fitting. Typical fittings are shown in FIG. 1 threaded into place, fittings 81, 82, and 83 being threaded into receptacles 34, 45 and 46, respectively. Attached to each of these fittings is a length of tubing. Attached to fitting 81 is a length of tubing 91, to which is connected the alarm 12. Attached to fittings 82 and 83 are lengths of tubing 92 and 93, which lead to the upstream and downstream sides, respectively, of the fluid filter with which device 10 is to be used. First inlet portion 72 of chamber 70 below ring 115 of valve member 110 is thus connected to the upstream or high pressure side of the filter. Second inlet portion 71 is connected to the downstream or low-pressure side.

It can thus be seen that when device 10 is connected with a fluid filter which has substantially equal upstream and downstream fluid pressures, as does an unclogged filter, the force of spring 140 will bias pressure balanced valve member 110 to the first operating portion of FIG. 2, in which the downward travel of valve member 110 is stopped because of the engagement or "bottoming" of end portion 113 against body 40. It can also be seen that when the fluid pressures above and below ring 115 of valve 110 reach a difference which results in an upward force greater than the downward force of spring 140, valve member 110 will begin to rise, breaking the seal between first chamber 60 and second inlet portion 71 of second chamber 70. Since the pressure of the fluid in second inlet portion 71 will drop rapidly due to the expansion of the fluid through first chamber 60 and outlet channel 33, the differences between fluid pressures above and below the ring will increase, valve member 110 thus snapping rapidly upward to the operating position of FIG. 3. In this position, alarm 12 will be actuated, signalling a need for maintenance.

If it is desired to delay maintenance of the fluid filter, adjustment cap 160 can be screwed further into bonnet 30, thereby increasing the downward force of spring 140 and moving piston 130 and valve 110 down, and reseating seal 116 against valve seat 100. The signal from the alarm will then cease, and the device will re-actuate at a higher pressure difference because of the increased compression of spring 140.

Because valve 110 responds to a pressure difference, not directly to line pressure, valve 110 is "balanced." Thus, within a range of non-destructive line pressures, device 10 can be used without modification.

The improved maintenance alarm device 10 thus described may be attached anywhere about the air filter with which it is to be used by means of bracket 14, shown in FIG. 1. Once it is in position, tubing of suitable length can be selected for connecting pressure taps upstream and downstream of the air filter to fittings 82 and 83.

When the system in which the device is placed is initially pressurized, the pressure difference across the ring of the valve member may momentarily exceed the difference necessary to trigger the device. Because of this, it is recommended that upstream inlet channel 43 have a fluid flow restriction 47 defined by body 40, as shown in FIG. 2. Such a restriction will prevent accidental triggering of the device by allowing the pressure above the ring to rise more rapidly than that below the ring.

It is also recommended that channels 33, 43 and 44, and receptacles 34, 45 and 46 is sized as shown, with the channels having a small width dimension in comparison to the width dimension of the receptacles. With this construction, the receptacles are effectively "dead-ended," which means reduced clogging and thus reduced maintenance of the device itself.

Thus there has been provided a maintenance alarm actuator which can actuate an alarm to signal that a fluid filter is in need of maintenance. It should be apparent to those having skill in the art that because triggering of the device is not dependent upon line pressure, but upon a pressure difference, the device may be used with a wide range of line pressures. It should also be apparent that by varying the size of the ring on the valve member and by substituting springs of differing spring constants, the device can be used for a variety of fluid filters, including both air filters and liquid filters, having a variety of pressure differences when clogged.

Thus there has been provided by the present invention a new and useful maintenance alarm device in which the objects set forth above, together with other throughly practical advantages, have been successfully achieved. While a preferred form of the present invention has been shown and described, it is to be understood that there are modifications, substitutions and alterations that may be made without going outside the scope of the present invention. Therefore, the present invention should be limited only by a liberal interpretation of the claims.

What is claimed is:

1. An improved maintenance alarm actuator adapted for actuating a warning alarm to signal the need to clean or change a fluid filter that is disposed in a fluid flow line and that is subject to clogging as a result to flow through the fluid flow line, the improved maintenance alarm actuator comprising:

a casing including: a main cylindrical cavity having a first diameter and having a first end and a second end; a second cylindrical cavity having a second diameter and being disposed adjacent to and in communication with the first end of the main cavity; and a cylindrical valve seat having a third diameter and being disposed adjacent to and in communication with the first end of the main cavity and with the second cylindrical cavity, with the longitudinal axes of the main cavity, the second cavity and the valve seat being coaxial and with the first diameter being greater than the third diameter;

a balanced valve element comprising: a first cylindrical end portion including a distal end of a fourth diameter and an adjacent, intermediate neck of a fifth diameter; a second cylindrical end portion with a sixth diameter; and a cylindrical flange portion with a seventh diameter and formed between the first and second end portions; the fourth diameter being substantially equal to the third diameter, the fifth diameter being less than the third and fourth diameters, and the seventh diameter being substantially equal to the first diameter providing for sealing engagement of the flange portion with the wall of the main cavity, and the valve element being disposed within the main cavity so that the first end portion of the valve element is disposed within the valve seat, so that the flange portion of the valve element is disposed within the main cavity and so that the valve element is slidable within the main cavity between a first portion wherein the distal end of the first end portion of the valve element is adjacent to the valve seat so as to block flow through the valve seat and a second position wherein the intermediate neck of the first end portion of the valve element is adjacent to the valve seat so as to permit flow through the valve seat;

means for biasing the valve element to its first position including means abutting the distal end of the first end portion of the valve element;

means for permitting communication between the fluid flow line, upstream of the fluid filter, and a higher pressure portion of the main cavity defined by the flange portion of the valve element and the second end of the main cavity so that the pressure of the fluid in the fluid flow line upstream of the fluid filter acts to bias the valve element to it second position;

means for permitting communication between the fluid flow line, downstream of the fluid filter, and a lower pressure portion of the main cavity defined by the flange portion of the valve element and first end of the cavity so that the pressure of the fluid in the fluid flow line downstream of the fluid filter acts to bias the valve element to its first position; and means, including the valve seat, and the second cavity for permitting communication between the lower pressure portion of the main cavity and the warning alarm when the force resulting from the pressure of the fluid in the higher pressure portion of the main cavity acting on the flange portion of the valve element exceeds the sum of the force resulting from the pressure of the fluid in the lower pressure portion of the main cavity acting on the flange portion of the valve element plus the force that the biasing means exerts on the valve element so that the valve element is moved to its second position and thereby permits flow through the valve seat.

2. The improved actuator of claim 1 further comprising adjustment means for adjusting the means for biasing the valve elements; wherein the casing includes an internal threaded counterbore whose longitudinal axis is coaxial with the longitudinal axis of the main cavity; wherein the biasing means includes a coil compression spring having one end abutting the distal end of the first end portion of the valve element; and wherein the adjustment means comprising a screw adjustment cap contacting the other end of the spring and having external threads for engaging said internal threads of the counterbore.

3. The improved actuator of claim 1 further comprising restriction means in the communication means between the fluid flow line and the higher pressure portion of the main cavity.

* * * * *